(12) United States Patent
Tsai (10) Patent No.: US 7,969,718 B2
(45) Date of Patent: Jun. 28, 2011

(54) COMPUTER KEYBOARD WITH TRANSPARENT COVERS FOR PROTECTING KEY CHARACTERS

(75) Inventor: Huo-Lu Tsai, Taichung Hsien (TW)

(73) Assignee: Sunrex Technology Corp., Ta Ya Shiang, Taichung Hsien (TW)

( * ) Notice: Subject to any disclaimer, the term of this patent is extended or adjusted under 35 U.S.C. 154(b) by 100 days.

(21) Appl. No.: 12/487,064

(22) Filed: Jun. 18, 2009

(65) Prior Publication Data
US 2010/0053870 A1    Mar. 4, 2010

(30) Foreign Application Priority Data

Sep. 4, 2008    (TW) ................................ 97215935 U (51) Int. Cl.
*G06F 1/16*    (2006.01)

(52) U.S. Cl. .................... 361/679.08; 400/488; 200/345
(58) Field of Classification Search ............. 361/679.13, 361/679.14, 679.11, 679.15, 679.16, 679.17; 400/682, 488, 490–492; 200/344, 345
See application file for complete search history.

(56) References Cited

U.S. PATENT DOCUMENTS

| | | | | |
|---|---|---|---|---|
| 5,654,872 A | * | 8/1997 | Sellers | 361/679.13 |
| 5,793,605 A | * | 8/1998 | Sellers | 361/679.13 |
| 6,137,676 A | * | 10/2000 | Merkel | 361/679.13 |

* cited by examiner

*Primary Examiner* — Hung V Duong (57) ABSTRACT

A computer keyboard in one embodiment includes a plurality of keys, each of the keys including a suspension structure and a key body supported by the suspension structure, the key body comprising a color body member, a transparent colorless protective cover formed on the body member, and at least one character formed on the body member by laser engraving through the protective cover onto the body member wherein the body member has a flat top.

6 Claims, 9 Drawing Sheets

COMPUTER KEYBOARD WITH TRANSPARENT COVERS FOR PROTECTING KEY CHARACTERS

BACKGROUND OF THE INVENTION

1. Field of Invention

The invention relates to computer keyboards and more particularly to a computer keyboard having transparent covers each for protecting character(s) on a key top.

2. Description of Related Art

Keyboards are used in a variety of applications for entry of alphanumeric and other types of data into a computer. Keyboards are typically light weight, low in cost, and easy to manufacture.

One problem of typical keyboards is that characters printed on tops of keys may become blurry due to long time contact with the hands in use. Hence, how to protect characters on the keys has become an issue in the manufacture of keyboards.

There have been numerous suggestions in prior patents for providing means to protect characters on the keys of a computer keyboard. For example, Taiwanese Publication Application No. 207,796 discloses an improved computer keyboard which is characterized as follows. A transparent protective cover is fastened on a key by snapping. Characters on the keys are thus protected. The protective cover may be flat, recessed, or raised. A recess is formed on either side of an inner surface of the key. End latches of the protective cover are adapted to securely engage with the recesses for securing the protective cover and the key together.

But this is unsatisfactory for the purpose for which the invention is concerned for the following reasons: The latching engagement is not reliable. Hence, it may loosen after a short period time of use. Further, the keys are relatively thick due to the provision of the protective covers thereon. Hence, the desire of manufacturing a thin keyboard is cannot be fulfilled and this further contracts the trends of miniaturization. Moreover, it is visually unaesthetic. Thus, the need for improvement still exists.

SUMMARY OF THE INVENTION

It is therefore one object of the invention to provide a computer keyboard having transparent covers each for protecting character(s) on a key top.

One aspect of the invention is to provide a computer keyboard including a plurality of keys, each of the keys including a suspension structure and a key body supported by the suspension structure, the key body comprising a color body member, a transparent colorless protective cover formed on the body member, and at least one character formed on the body member by laser engraving through the protective cover onto the body member wherein the body member has a flush top.

Another aspect of the invention is to provide a computer keyboard including a plurality of keys, each of the keys including a suspension structure and a key body supported by the suspension structure, the key body comprising a body member having a top recess, a protective cover secured onto the top recess, and a transparent layer coated on an underside of the protective cover and having at least one character formed thereon by printing.

The above and other objects, features and advantages of the invention will become apparent from the following detailed description taken with the accompanying drawings.

DETAILED DESCRIPTION OF THE INVENTION

Referring to FIGS. 1 to 7, a keyboard 1 in accordance with a first preferred embodiment of the invention is shown. The keyboard 1 comprises the following components as discussed in detail below.

Figure 1:
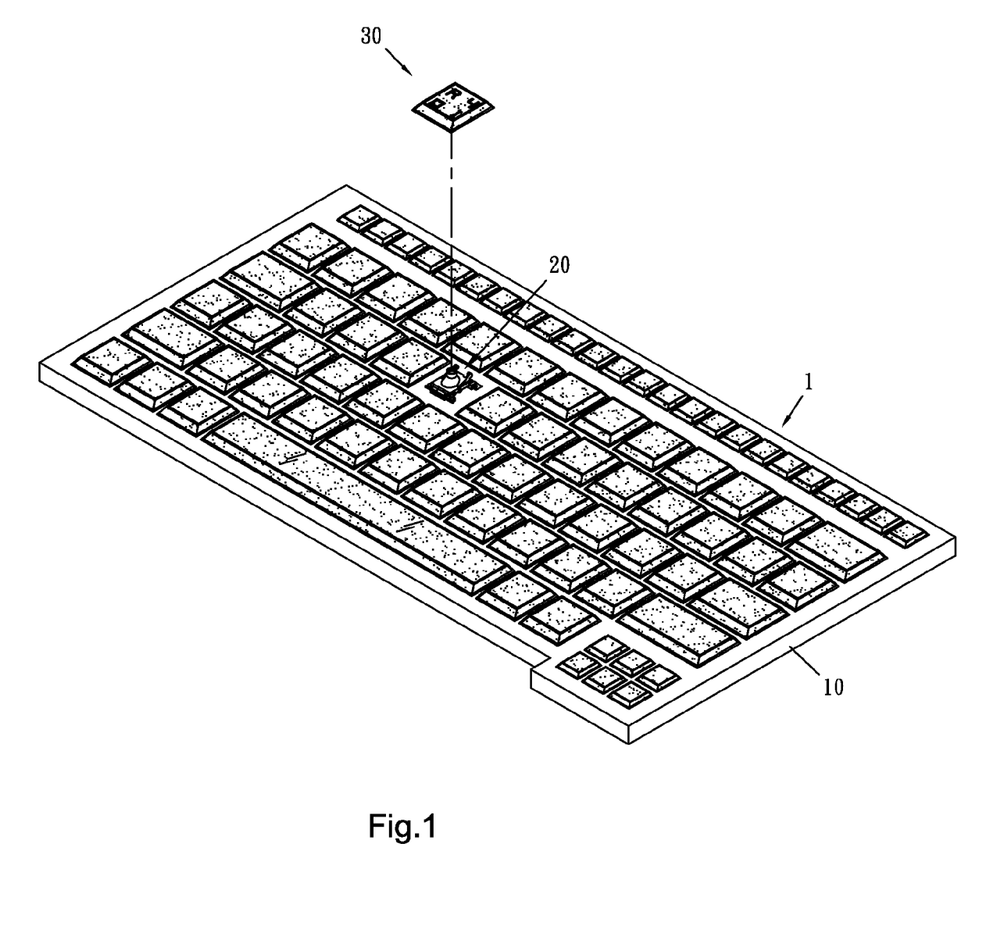
FIG. 1 is a perspective view of a keyboard according to a first preferred embodiment of the invention where a key body being detached.
Figure 2:
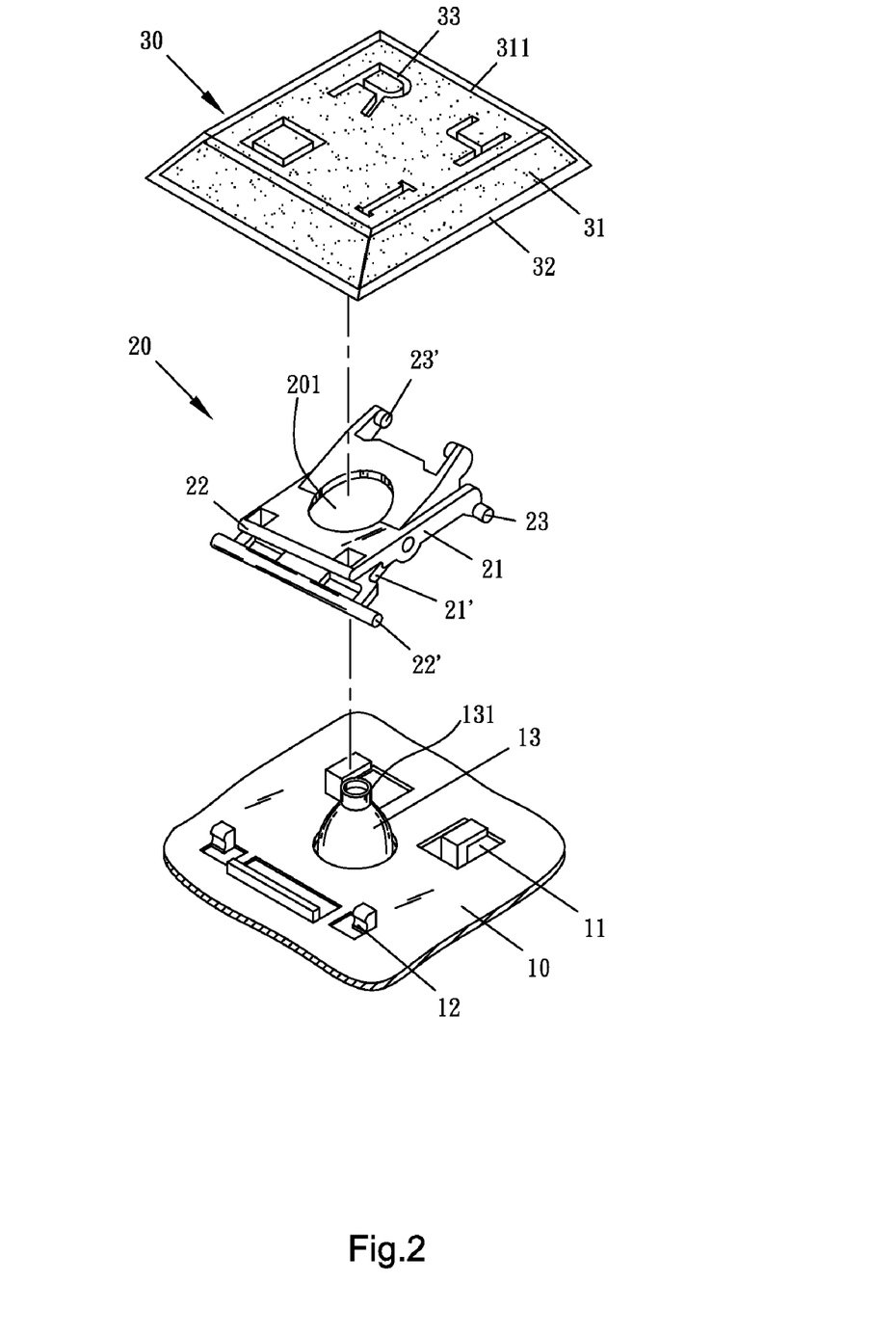
FIG. 2 is an enlarged, exploded view of the detached key of FIG. 1.

A substantially rectangular monoblock 10 comprises a plurality of distinct rectangular zones (not numbered) each with one of a plurality of keys 1 mounted thereon. As shown in FIG. 2, each zone is provided with two first fastening grooves 11 at two upper corners, two second fastening grooves 12 at two lower corners, and a resilient dome 13 projecting upward from a center, the dome 13 having an upper, annular flange 131 and a guide stem 132 having a contact switch (not numbered) on a bottom.

The monoblock 10 further comprises a transparent membrane 14 provided beneath an underside of the monoblock 10 with the domes 13 formed thereon, a membrane circuit board 15 provided below the transparent membrane 14, and a bottom plate 16 provided below the membrane circuit board 15.

Figure 3:
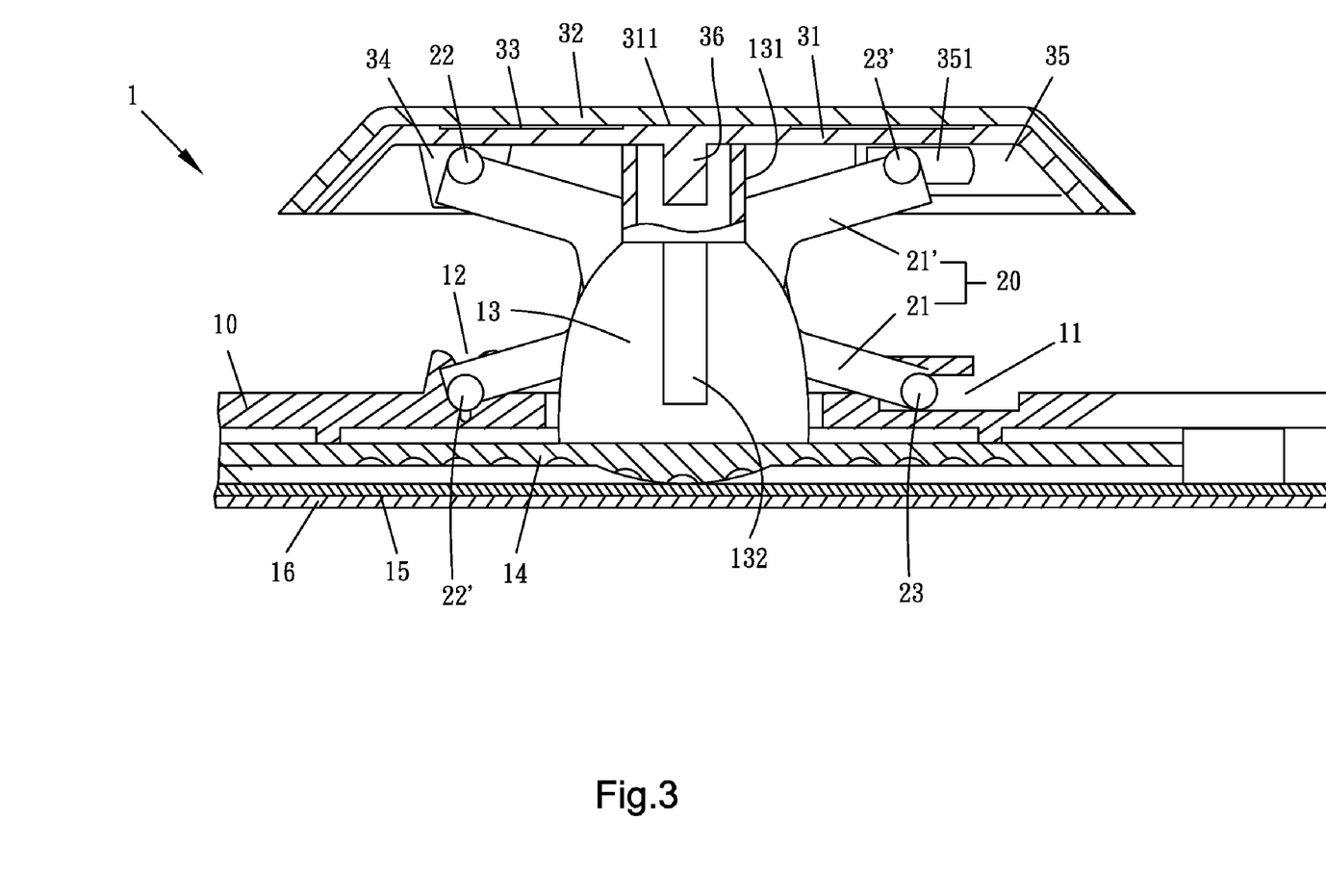
FIG. 3 is a longitudinal sectional view of a key mounted on the keyboard of FIG. 1.
Figure 4:
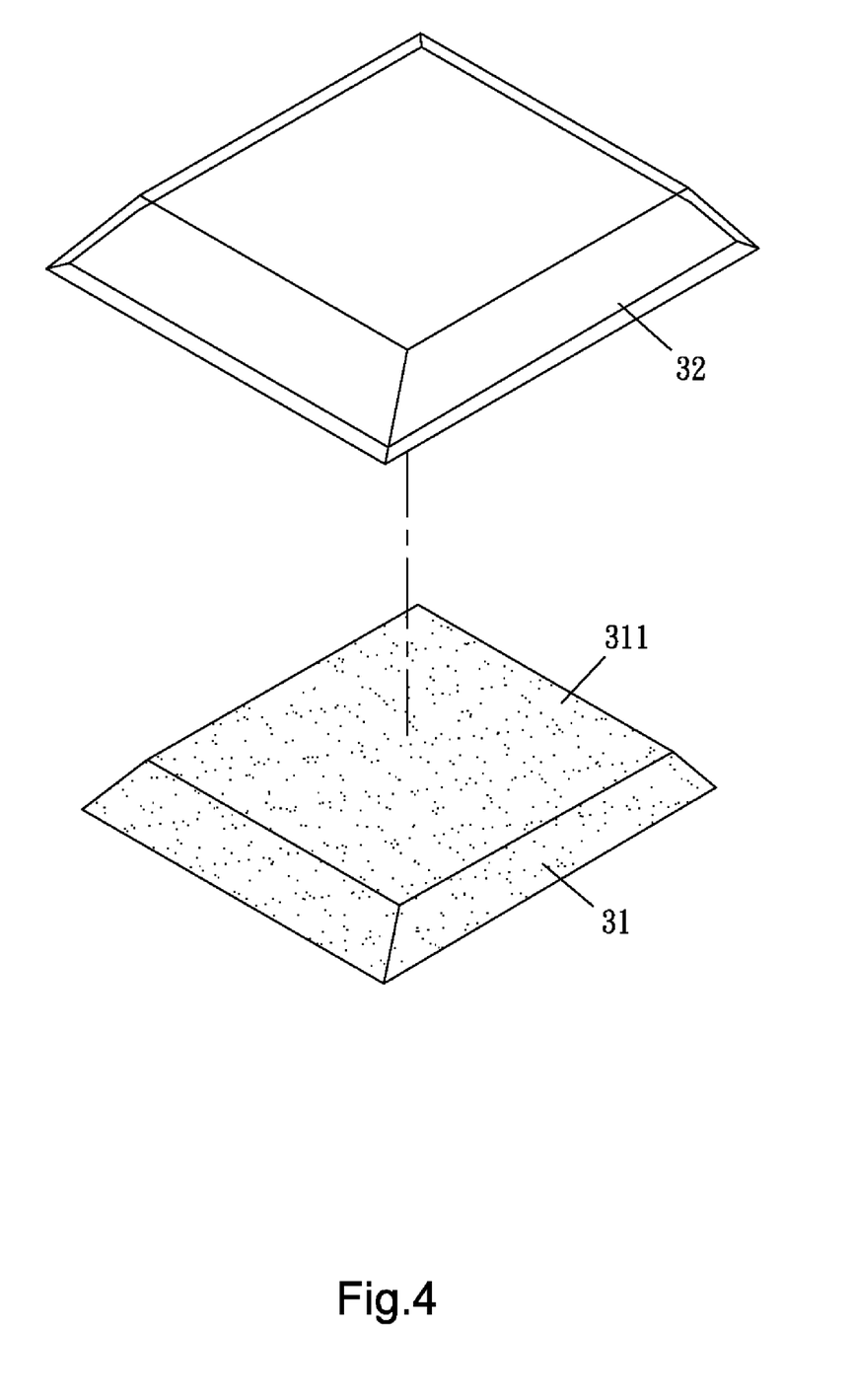
FIG. 4 is an exploded view of the key body of FIG. 2 with the characters removed.
Figure 5:
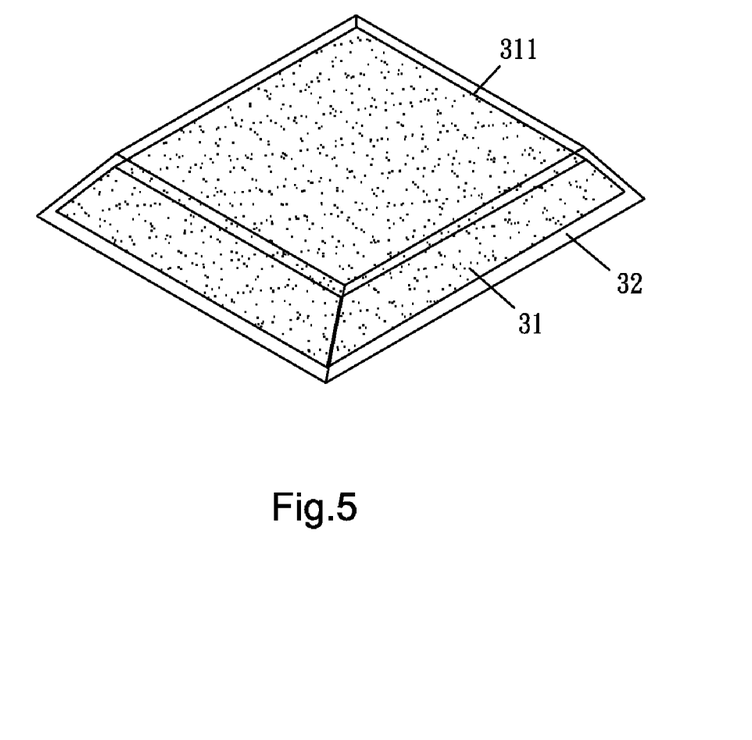
FIG. 5 is a perspective view of the assembled key body of FIG. 4.
Figure 6:
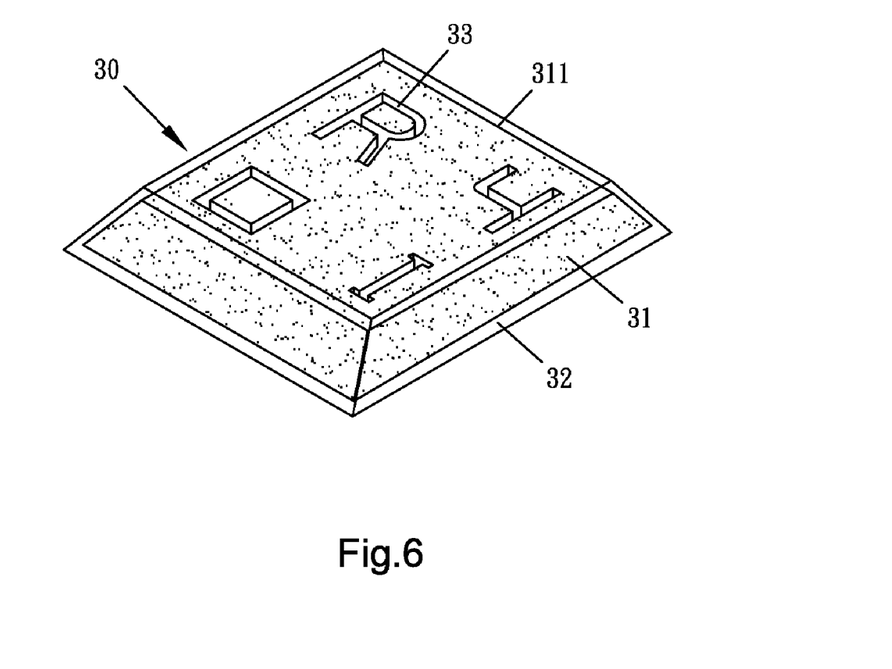
FIG. 6 is a view similar to FIG. 5 where the finished key body with characters formed thereon is shown.
Figure 7:
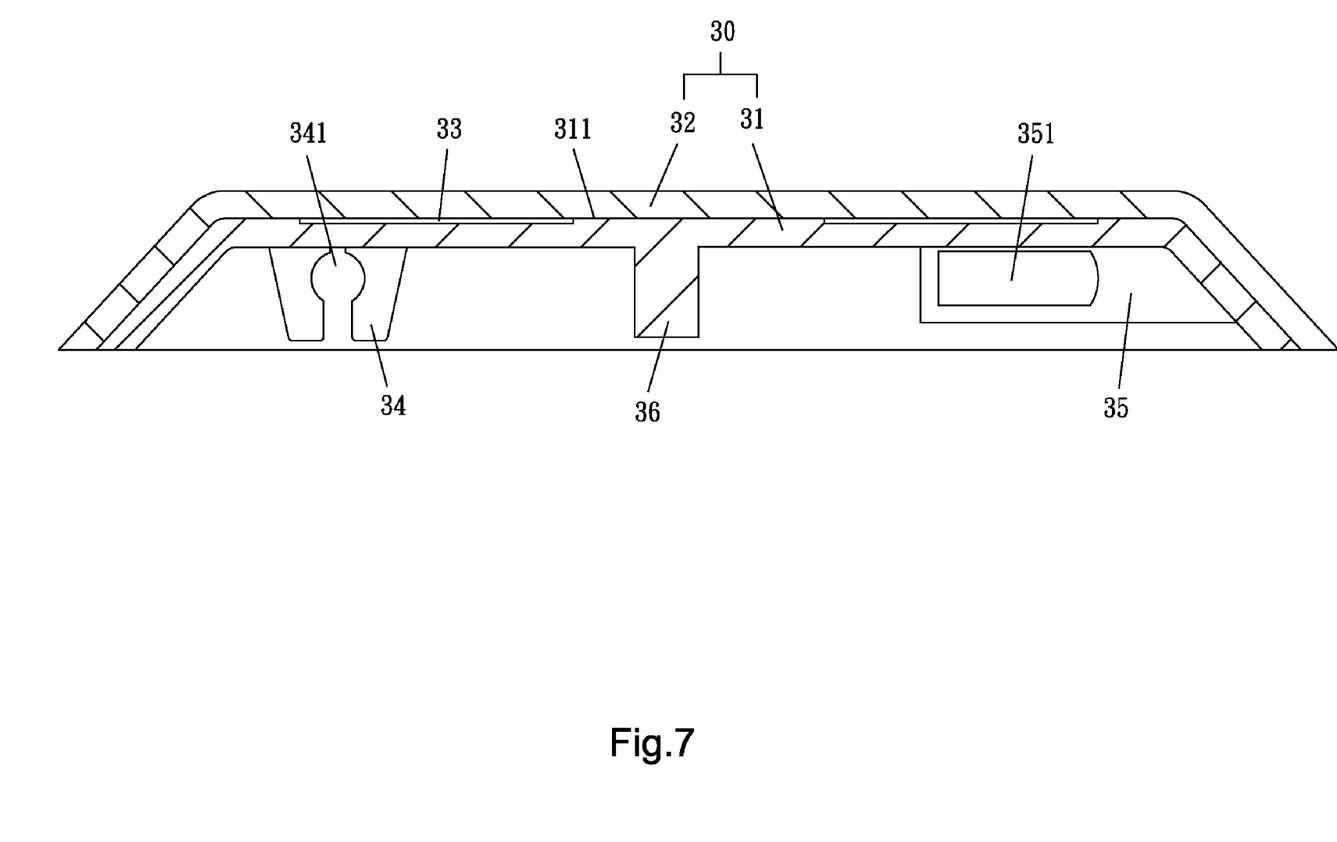
FIG. 7 is a longitudinal sectional view of the key body of FIG. 6.

A plurality of suspension structures 20 each comprises a substantially U-shaped first member 21 having two pins 23 at both sides of one end and a pivot 22 at the other end, and a substantially U-shaped second member 21' having a pivot 22' at the other end and two pins 23' at both sides of one end. The first and second members 21, 21' are pivotably secured together at both sides thereof to form the suspension structure 20 having a section of "X" as shown in FIG. 3 with a central hole 201 being defined. The pivot 22' is secured to the second fastening grooves 12 by snapping and the pins 23 are secured to the first fastening grooves 11 by snapping with the dome 13 inserted through the hole 201.

A plurality of rectangular key bodies 30 each comprises an opaque color body member 31 having a raised top 311, and a transparent colorless protective cover 32 on the body member 31. The protective cover 32 and the body member 31 can be either (i) manufactured separately and secured together by adhering or (ii) formed integrally by injection molding by employing two plastic materials of different colors (see FIG. 5). Note that the body member 31 may have one of a plurality of different colors in other embodiments. Alternatively, the body member 31 may be transparent in other embodiments.

The key body 30 further comprises, for example, a set of four unique characters 33 formed on four corners of the top 311 by laser engraving through the protective cover 32 onto the top 311 of the body member 31. The characters 33 is flush with the top 311 of the body member 31, i.e., the top 311 is flat after forming the characters 33 thereon. On an inner surface of the body member 31 there are provided two first joints 34 each having a trough 341 proximate the other end, two second joints 35 each having a channel 351 proximate one end, and a key stem 36 extending downward from a center. The key stem 36 is disposed in the annular flange 131, the pivots 22 are pivotably disposed in the troughs 341 of the first joints 34, and the pins 23' are pivotably disposed in the channels 351 of the second joints 35 when the key body 30 is installed on the suspension structure 20. As a result, the key body 30 is mounted on the suspension structure 20. The key body 30 is capable of upward or downward moving when it is depressed by the finger.

It is envisaged by the invention that the characters 33 are protected by the protective cover 32. Further, the protective cover 32 is thin and light weight. Thus, the keys 1 are aesthetic with only a minimum of additional weight being added thereon.

Referring to FIGS. 8 to 11, a keyboard in accordance with a second preferred embodiment of the invention is shown. The characteristics of the second preferred embodiment are detailed below. A plurality of rectangular key bodies 40 each comprises an opaque, rectangular body member 41 having a recessed top 411, a transparent, colorless protective cover 43 shaped to conform to the rectangular top 411 so as to fit thereon, and a transparent layer 42 coated on an underside of the protective cover 43 and having, for example, a set of four unique characters 421 formed on four corners of the transparent layer 42 by printing in reverse. Note that the transparent layer 42 may have one of a plurality of different colors. Also, the edge of the protective cover 43 is higher than the body member 41. Hence, the key 1 has an uneven top (see FIG. 8).

Figure 8:
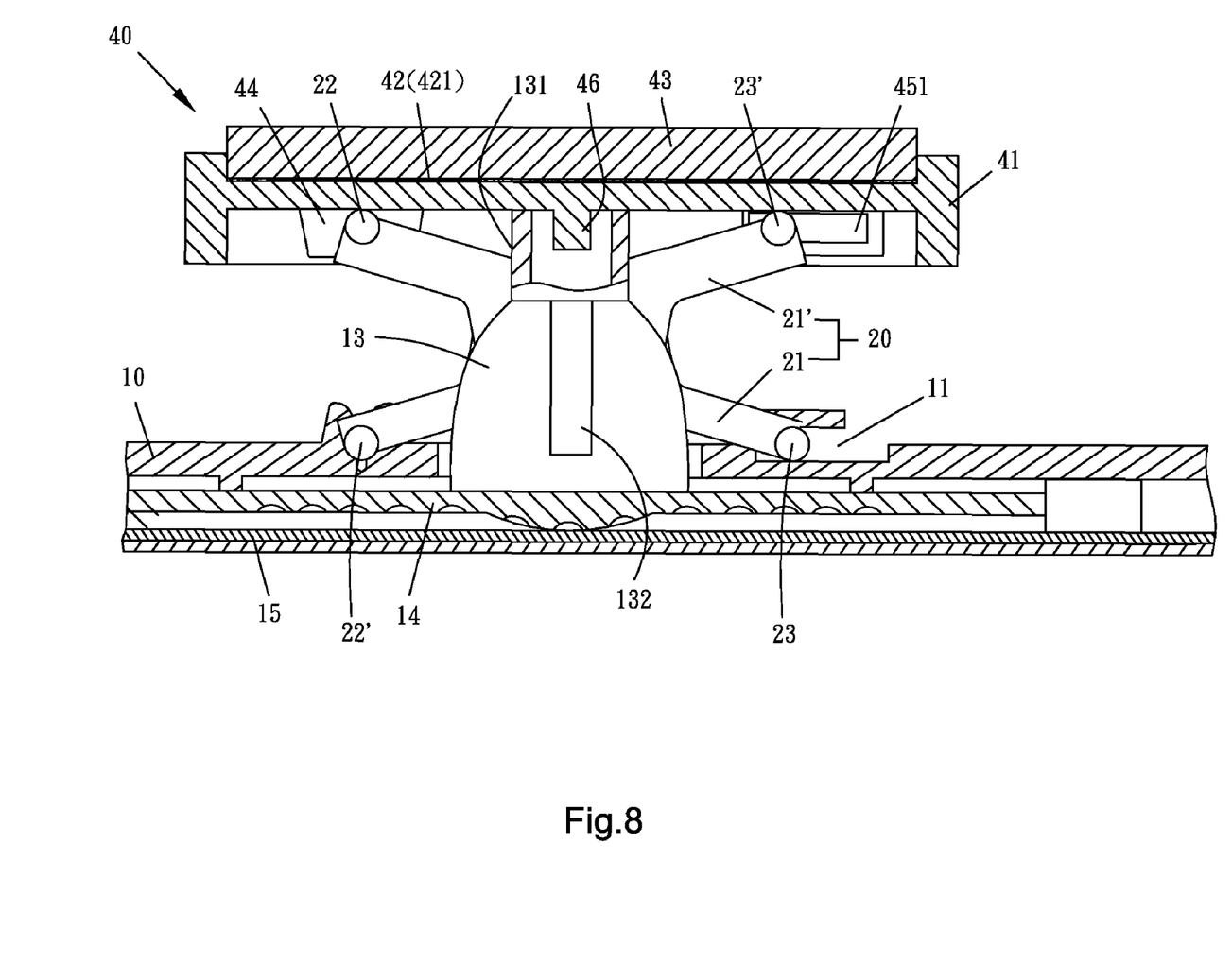
FIG. 8 is a longitudinal sectional view of one of keys of a computer keyboard according to a second preferred embodiment of the invention.
Figure 9:
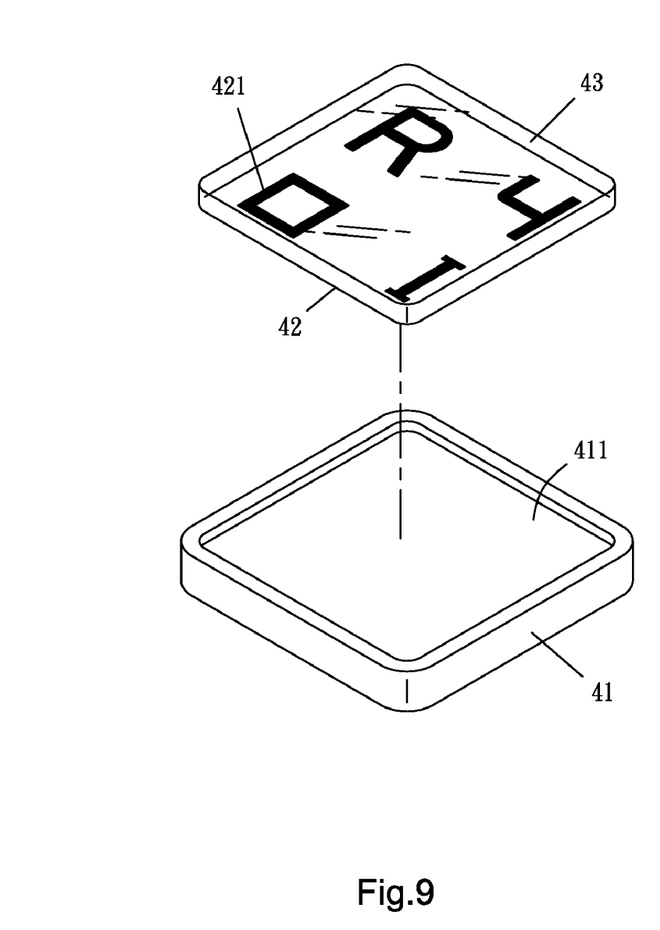
FIG. 9 is an exploded view of the key body of FIG. 8.
Figure 10:
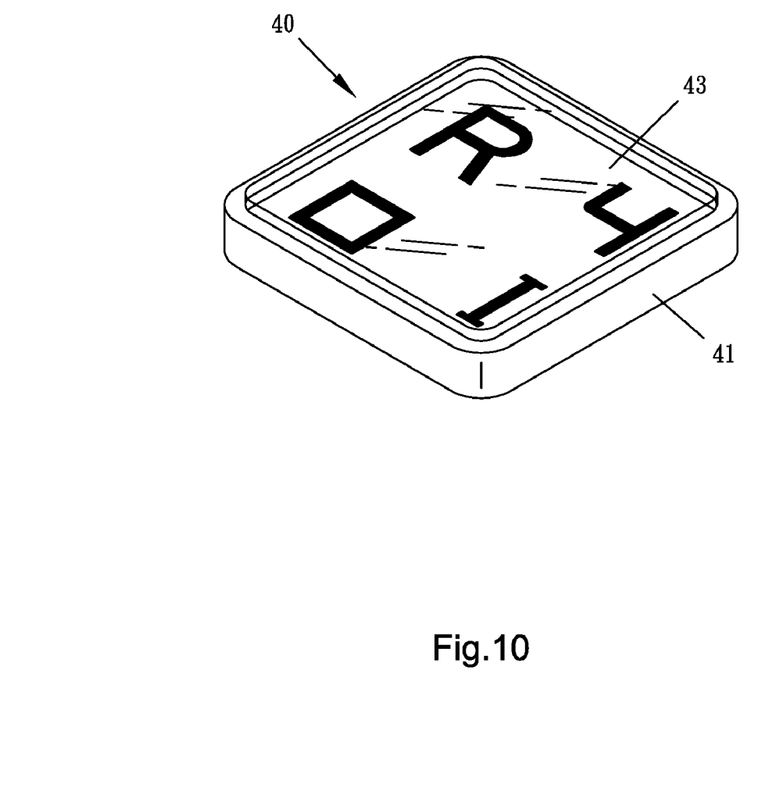
FIG. 10 is a perspective view of the assembled key body of FIG. 9.
Figure 11:
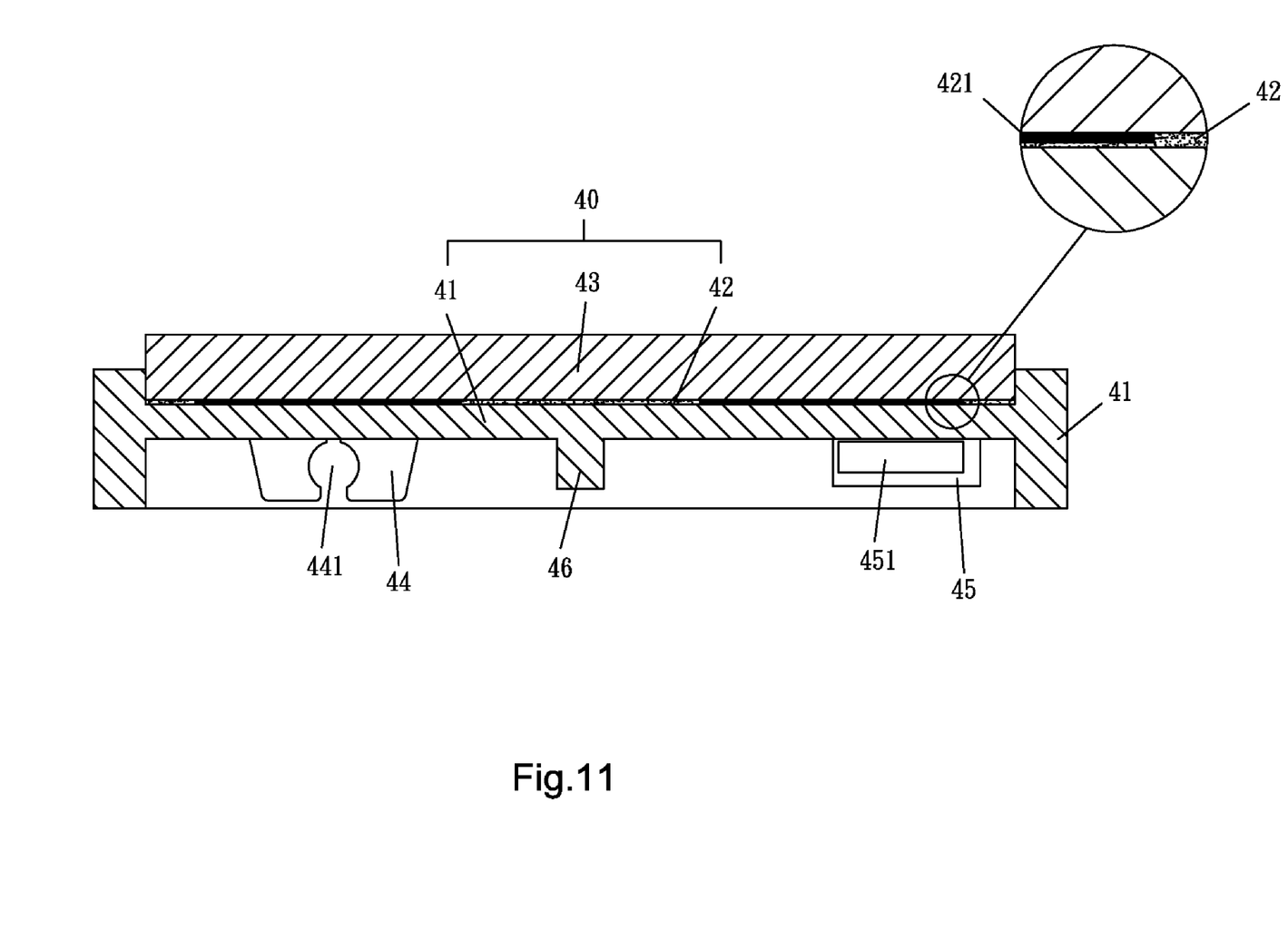
FIG. 11 is a longitudinal sectional view of the key body of FIG. 10.

On an inner surface of the body member 41 there are provided two first joints 44 each having a trough 441 proximate the other end, two second joint 45 each having a channel 451 proximate one end, and a key stem 46 extending downward from a center. The key stem 46 is disposed in the annular flange 131, the pivots 22 are pivotably disposed in the troughs 441 of the first joints 44, and the pins 23' are pivotably disposed in the channels 451 of the second joints 45 when the key body 40 is installed on the suspension structure 20. As a result, the key body 40 is mounted on the suspension structure 20. The key body 40 is capable of upward or downward moving when it is depressed by the finger.

It is envisaged by the invention that the fastening of the protective cover 43 and the body member 41 is secured. Further, the characters 421 are protected by the protective cover 43. Furthermore, the protective cover 43 is thin and light weight. Thus, the keys 1 are aesthetic with only a minimum of additional weight being added thereon.

Note that in either embodiment the contact switch of the guide stem 132 may electrically connect to a circuit (not shown) for conducting the circuit so that a signal representing the depressed key can be generated as known in the art.

While the invention herein disclosed has been described by means of specific embodiments, numerous modifications and variations could be made thereto by those skilled in the art without departing from the scope and spirit of the invention set forth in the claims.

What is claimed is:

1. A computer keyboard comprising;
a plurality of keys, each of the keys including a suspension structure and a key body supported by the suspension structure, the key body comprising a body comprising a color body member, a transparent colorless protective cover formed on the body member, and at least one character formed on the body member by laser engraving through the protective cover onto the body member wherein the body member has a flat top;
a monoblock with the keys mounted thereon; and
a plurality of resilient domes, each of the domes being disposed below the key and including an upper, annular flange, wherein the body member includes two first joints on an inner surface, each of the first joints having a trough proximate one end, two second joints on the inner surface thereof, each of the second joints having a channel proximate the other end, and a key stem extending downward from a center, wherein the suspension structure comprises a substantially U-shaped first member having one end pivotably secured to the troughs of the first joints, and the other end pivotably fastened on a bottom of the monoblock, and a substantially U-shaped second member having one end pivotably fastened on the bottom of the monoblock, and the other end pivotably secured to the channels of the second joints, the first and second members being pivotably secured together at both sides thereof with the flange inserted through a center; and wherein the key stem is slidably disposed in the flange so that the suspension structure can be operated as a toggle in response to depressing the key body by a finger.

2. A computer keyboard comprising:
a plurality of keys, each of the keys including a suspension structure and a key body supported by the suspension structure, the key body comprising a body member having a top recess and a protective cover secured onto the top recess, the protective cover having at least one character formed on an underside by printing; and
a monoblock with the keys mounted thereon.

3. The computer keyboard of claim 2, wherein the at least one character is formed on the transparent layer by printing in reverse.

4. The computer keyboard of claim 2, wherein the body member is opaque and rectangular, and wherein the protective cover is transparent, colorless, and rectangular.

5. The computer keyboard of claim 2, further comprising a transparent layer coated on the underside of the protective cover.

6. The computer keyboard of claim 2, further comprising a plurality of resilient domes, each of the domes being disposed below the key and including an upper, annular flange, wherein the body member includes two first joints on an inner surface, each of the first joints having a trough proximate one end, two second joints on the inner surface thereof, each of the second joints having a channel proximate the other end, and a key stem extending downward from a center, wherein the suspension structure comprises a substantially U-shaped first member having one end pivotably secured to the troughs of the first joints, and the other end pivotably fastened on a bottom of the monoblock, and a substantially U-shaped second member having one end pivotably fastened on the bottom of the monoblock, and the other end pivotably secured to the channels of the second joints, the first and second members being pivotably secured together at both sides thereof with the flange inserted through a center; and wherein the key stem is slidably disposed in the flange so that the suspension structure can be operated as a toggle in response to depressing the key body by a finger.

* * * * *